Oct. 31, 1939.  W. M. FELLERS  2,177,642
AIRCRAFT COWLING
Filed June 15, 1938  3 Sheets-Sheet 1

INVENTOR
William M. Fellers
BY
Ransom N. Davis
ATTORNEY

Oct. 31, 1939.   W. M. FELLERS   2,177,642
AIRCRAFT COWLING
Filed June 15, 1938   3 Sheets-Sheet 2

INVENTOR
William M. Fellers
BY
Ransom N. Davis
ATTORNEY

Oct. 31, 1939.   W. M. FELLERS   2,177,642
AIRCRAFT COWLING
Filed June 15, 1938   3 Sheets-Sheet 3

INVENTOR
William M. Fellers
BY
Ransom K. Davis
ATTORNEY

Patented Oct. 31, 1939

2,177,642

UNITED STATES PATENT OFFICE 2,177,642

AIRCRAFT COWLING

William M. Fellers, Newtown Square, Pa.

Application June 15, 1938, Serial No. 213,898

2 Claims. (Cl. 244—53)

(Granted under the act of March 3, 1883, as amended April 30, 1928; 370 O. G. 757)

This invention relates to an aircraft cowling, and has for an object to provide an improved cowling which will serve to eliminate an objectionable thin shell of hot air which is normally present entirely about the fuselage, providing discomfort to the pilot and inefficiency to the engine, in that it prevents access of a normal supply of cool air to the carburetor.

A further object of this invention is to provide an aircraft cowling which will improve the aerodynamic characteristics of the aircraft by slowing down the speed of the exhaust and speeding up the speed of the cooling air about the engine, so that both the exhaust and the cooling air will be discharged along the bottom of the aircraft at a speed close to that of the aircraft, eliminating the objectionable burbling otherwise present, thus increasing the speed of the airplane by lessening the resistance to motion.

A further object of this invention is to provide an aircraft cowling which will improve the aerodynamic characteristics of the airplane by increasing the velocity of the air flowing into the engine compartment through the entrance port or ports, such that the air entering the compartment flows through the entrance at more nearly the relative speed of cowl and the outside air flowing past it. The advantage of this is twofold in that the area of the entrance is thereby made smaller than could otherwise be done and the area of the cross-section of the air entering the entrance is diminished. Both these factors reduce the resistance of the airplane to forward motion, and increase its speed.

A further object of this invention is to provide an aircraft cowling which will direct the exhaust gases and also the hot air from the engine compartment away from zones of particular danger, such as the neighborhood of the fuel dump or drain valves, or from any other sector where the presence of hot gases or particles of burning or heated matter would constitute jeopardy or discomfort.

A further object of this invention is to provide an aircraft cowling which will improve the safety of an airplane by providing non-combustible material between particularly vulnerable parts of the airplane such as fuel dump and drain valves or other parts particularly susceptible to heat, and parts of the engine such as exhaust manifolds, spark plugs, and other parts that become highly heated during use and which may cause a fire to start after a crash if they come in contact with combustible material.

A further object of this invention is to utilize some of the energy in the high velocity exhaust gases to help draw cooling air around the engine or radiator. By reducing the velocity of the out flowing exhaust gases and increasing the velocity of the out flowing air, the velocity of the combined cooling air and exhaust gases is brought more nearly to that of the passing outside air, with the result that less disturbance of the mixing currents is caused, the resistance of the airplane is reduced, and the speed increased.

With the foregoing and other objects in view, the invention consists in the construction, combination and arrangement of parts hereinafter described and illustrated in the drawings, in which.

Figure 1:
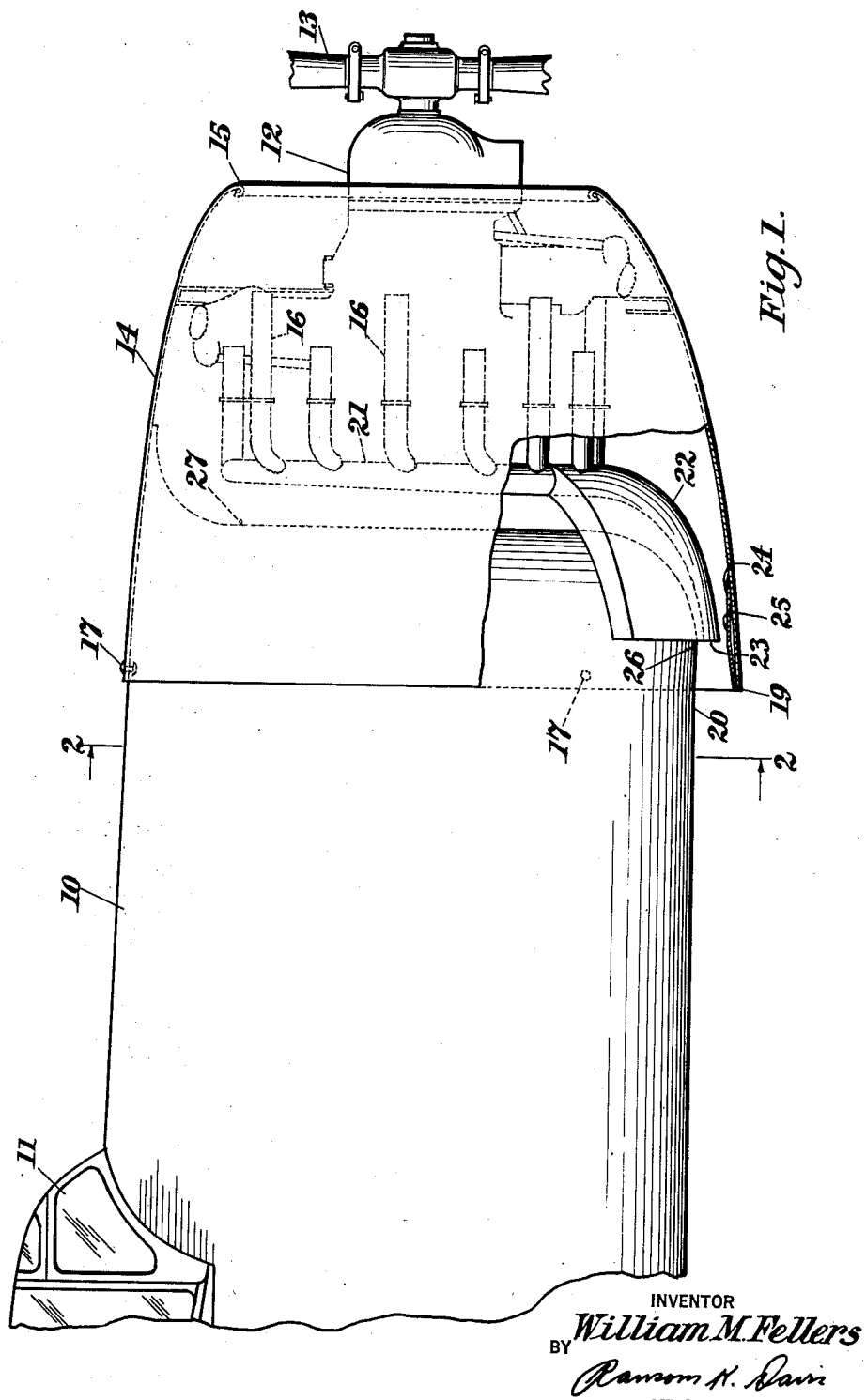
Fig. 1 is an elevational, partly broken away ghost view of an airplane fuselage and motor to which this invention has been applied.
Figure 3:
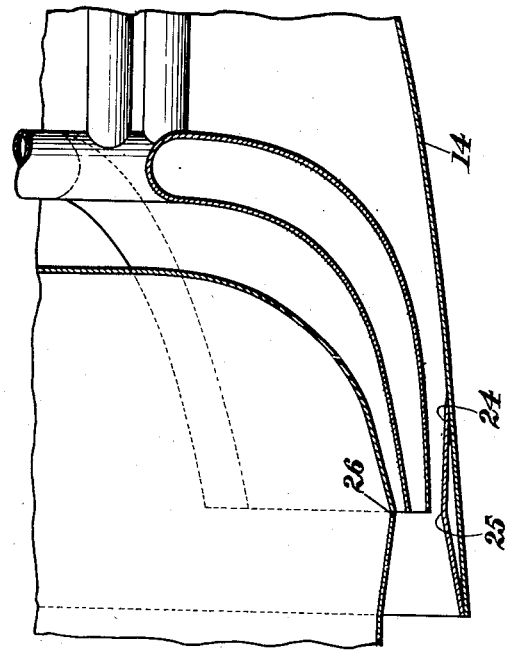
Fig. 3 is a sectional view on line 3—3 of Fig. 2 and Fig. 5.

There is shown at 10 a fuselage having a cabin with shield 11, and an aircraft motor 12 of the radial air cooled type, with the usual propeller 13. The cowling 14 of this invention encompasses the motor 12 in the usual manner, having the usual opening 15 for admitting air to the cylinder and cylinder exhaust pipes 16.

The rear of the cowling 14 instead of being spaced from the fuselage 10 in the normal manner, is faired closely thereto about some of the sides as at 17, but at least on edges 19 is spaced a substantial distance from the bottom 20 of the fuselage.

Connected to the cylinders and exhaust pipes 16 is an exhaust collector ring 21 which leads to a single ejector gill 22 along the bottom with its mouth 23 discharging into the space between the fuselage side 20 and the cowling edge 19.

The extra wall 24, arched in its middle as at 25, may be provided in the edge 19 of the cowling 14, the fuselage wall being correspondingly arched as at 26, so as to form in effect a Venturi opening between the arches 25 and 26 into which the mouth 23 of gill 22 discharges. Leading to the arch 26 of the fuselage side 20 is the inner cowling wall 27.

The drawings clearly show the invention in a particular application. The invention is equally applicable; when any type of opening or openings are used for the entrance of cooling air, in lieu of the method illustrated in 15; when the engine or engines are located at any other position or positions on the airplane, such as above, below or to the sides of the fore and aft axis of the airplane, on the wings, or for pusher or tractor engine installations; when the motor is directly cooled by air or when the air acts through an intermediary or intermediaries such as a radiator and a liquid or gas; when the exhaust is collected in a manifold or when more than one exhaust openings are utilized; when the location of the exit of exhaust gases and air is at the bottom of the cowl or at any other position relative to the airplane or engine, to avoid having the path of the heated gases pass close to objects which it is desired to avoid heating or subjecting to the hazard of catching on fire; when one or more than one ejector gills are formed to function as a Venturi ejector.

In operation, the opening 15 is of such a size as to secure an adequate supply of air from the propeller 13, even under the most adverse conditions, such as in a high power climb. The air passing through the opening 15 encompasses the motor 12 and the cylinders and exhaust pipes 16, as well as the collector ring 21. It is thence guided toward the Venturi openings formed by the walls of the gill mouth 23 and the arched walls 25 and 26. This tends to speed up the flow of the air, while at the same time it slows down the flow of the exhaust and also provides a sheathing of cool air about the exhaust, thus insulating parts of the airplane in line with the exhaust from direct contact with hot engine exhaust matter. At the same time it diminishes burbling and provides an increase in speed of the aircraft, by reducing its head resistance.

The exhaust products, consisting of hot gases, unburned oil and hot particles of matter are more or less completely separated from contact with parts of the aircraft by an envelope or envelopes of cooling air in which they are enclosed as they emerge through the Venturi openings or opening. Such small quantities of the exhaust material as penetrate the envelope or envelopes of cooling air may be directed away from such regions as in the way of the pilot's head and body, or in the way of disadvantageous or dangerous locations such as fuel dump or drain valves, by placing the Venturi exhaust openings in suitable locations, out of line with the places to be avoided.

Figure 4:
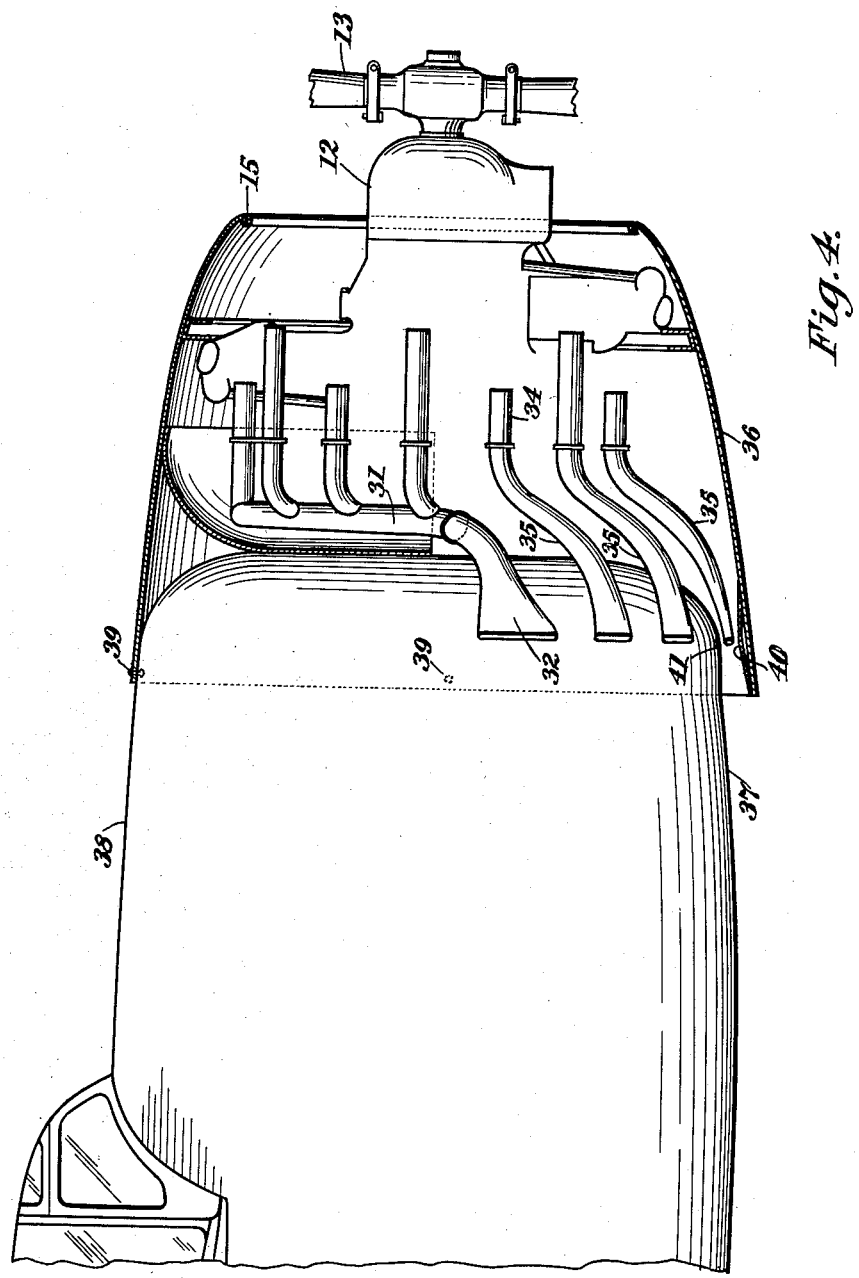
Fig. 4 is a partly sectional view of another form of this invention.

In Fig. 4 the collector ring 31 leads to separate small gills 32 on opposite sides of the upper half of the motor, while the lower exhaust pipes 34 each discharge through individual gills 35. The gills 32 and 35, however, each discharge in substantially the same position between the cowling 36 and the fuselage or nacelle outer surface 37, although in this case the cowling 36 is faired into the fuselage 38, as at 39, from the top and down to about the midpoint of the fuselage, the same Venturi effect and the same operation being provided by the arched wall 40 cooperating with the arch 41 provided in fuselage bottom 37.

Figure 5:
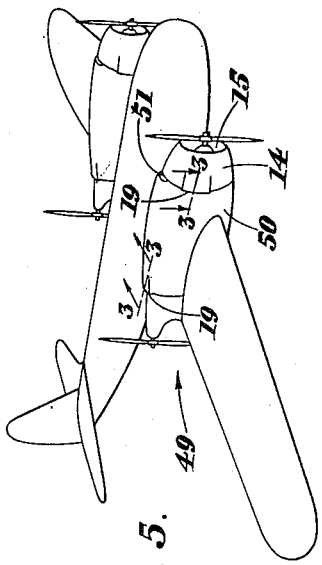
Fig. 5 is a perspective view of a multi-motor airplane to which this invention has been applied.
Figure 2:
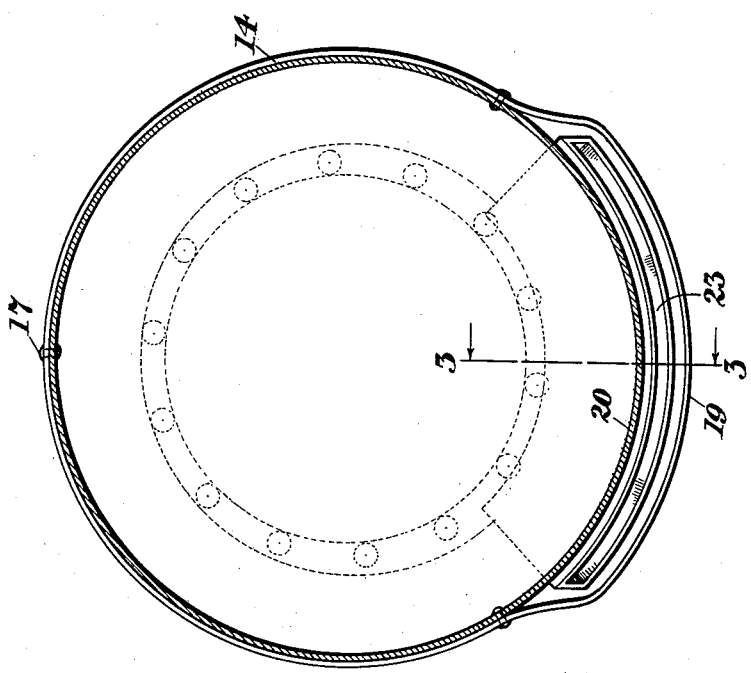
Fig. 2 is a sectional view on line 2—2 of Fig. 1.

In Fig. 5, the invention is shown as applied to a multi-motor airplane 49 having motor nacelles 50, which may each include one or more motors and propellers to each of which this invention has been applied. In this case two motors are shown as being in each nacelle, the forward motor being an air cooled radial motor and having a tractor propeller and the rearward motor being an in-line air-cooled motor and having a pusher propeller. The forward motor in the nacelle has the same cowling opening 15 as in the other figures, and discharges the air and products of combustion through a forward opening 19 between its forward cowling 14 and the nacelle side, while the rearward motor has an airscoop opening 51 through which air passes to cool the motor and mix with the products of combustion and discharge through the rearward opening 19.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In combination with an aircraft fuselage, an aircraft cowling, said cowling being faired to said fuselage about the top and sides thereof and being spaced from said fuselage at the bottom thereof, and motor exhaust discharge means in the space between the bottom of the fuselage and the bottom of the cowling, said exhaust discharge means being in the form of a single gill, said fuselage bottom and said cowling bottom being in juxtaposition to provide a Venturi tube effect about said single gill.

2. In combination with an aircraft fuselage, an aircraft cowling, said cowling being faired to said fuselage about the top and sides thereof and being spaced from said fuselage at the bottom thereof, and motor exhaust discharge means in the space between the bottom of the fuselage and the bottom of the cowling, said exhaust discharge means being in the form of a plurality of gills, said fuselage bottom and said cowling bottom being in juxtaposition to provide a Venturi tube effect about said plurality of gills.

WILLIAM M. FELLERS.